No. 734,061. Patented July 21, 1903.

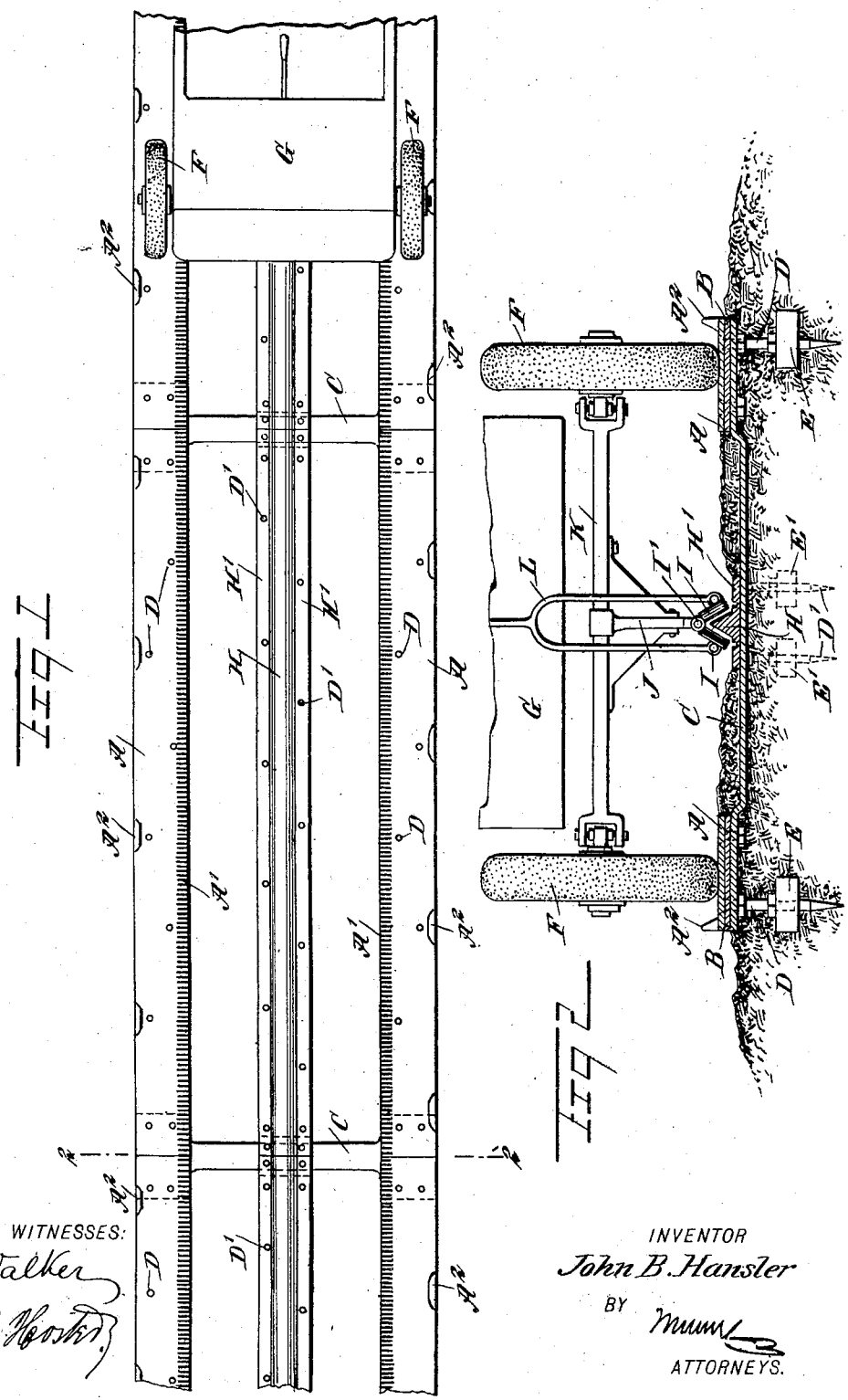

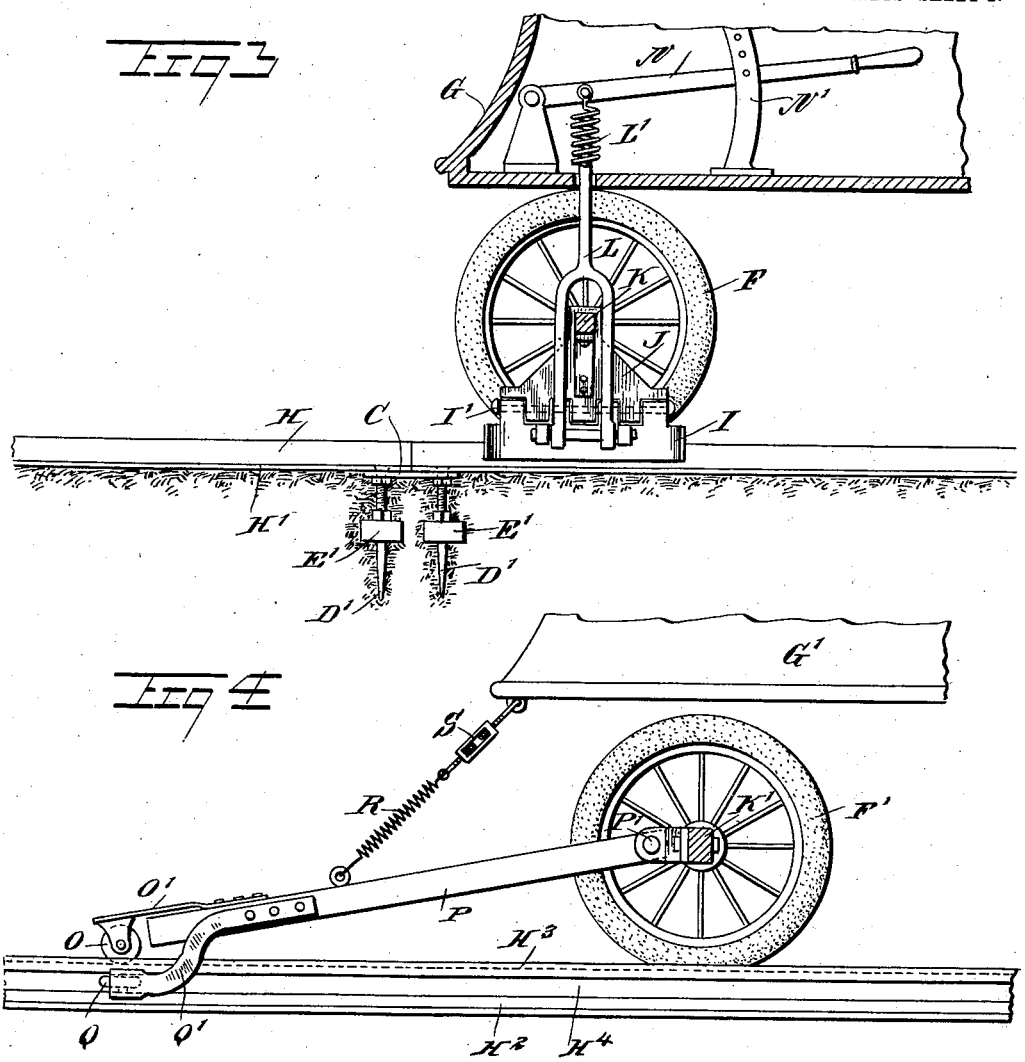

UNITED STATES PATENT OFFICE.

JOHN B. HANSLER, OF NEWBURGH, NEW YORK.

ROADWAY AND VEHICLE FOR TRAVELING THEREON.

SPECIFICATION forming part of Letters Patent No. 734,061, dated July 21, 1903.

Application filed October 2, 1902. Serial No. 125,666. (No model.)

*To all whom it may concern:*

Be it known that I, JOHN B. HANSLER, a citizen of the United States, and a resident of Newburgh, in the county of Orange and State of New York, have invented a new and Improved Roadway and Vehicle for Traveling Thereon, of which the following is a full, clear, and exact description.

The invention relates to bicycle-tracks, such as shown and described in the Letters Patent of the United States No. 580,686, granted to me April 13, 1897.

The object of the invention is to provide a new and improved roadway for vehicles which is simple, durable, and cheap in construction, more especially designed for use by automobiles and other similar power-propelled vehicles, and arrranged to properly steer the vehicle without the aid of an operator in charge of the vehicle and to allow of safely running the vehicle at a high rate of speed.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement. Fig. 2 is an enlarged transverse section of the same on the line 2 2 in Fig. 1. Fig. 3 is a longitudinal sectional elevation of the same. Fig. 4 is a similar view of a modified form of the same, and Fig. 5 is a cross-section of the same.

The improvement illustrated in Figs. 1, 2, and 3 consists, essentially, of a wheel-track formed by two track-rails A, spaced a suitable distance apart and formed of flat metal plates resting directly on the ground, the ends of adjacent plates being connected with each other at the under side by fish-plates B, and the oppositely-located fish-plates of the track-rails are rigidly connected with each other by a cross-beam C, bolted or otherwise fastened with the fish-plates to the rail-plates to form a rigid track on the ground, as plainly illustrated in the drawings.

The rails A are anchored in the ground by suitable pins D, secured to the rails and extending downward from the same to carry near their lower ends anchoring-blocks E to prevent upward or shifting movement of the rails on the ground. On the top of the plates forming the rails are mounted to travel wheels F of the automobile or other vehicle G, it being understood that the plates forming the rails are of a sufficient width to readily accommodate the vehicle-wheels F to allow sidewise movement thereof to a limited extent, but sufficient to insure safe running of the wheels on the rails. The inner portions of the faces of the plates forming the rails A are preferably corrugated or roughened, as at A', and the outer portions of the said plates are provided with upwardly-extending lugs $A^2$, spaced suitable distances apart, to act as guards for the wheels F to prevent the same from running off the rails.

In order to properly steer the vehicle G without any aid whatever from the operator in charge of the vehicle, I provide a steering-rail H, preferably triangular in cross-section, as shown in Fig. 2, and having side flanges H', bolted or otherwise secured to the cross-beam C, as plainly shown in Fig. 1. The steering-rail H is located midway between the side rails of the track and flanked by jaws I, pivoted at I' on the lower end of an arm J, secured to the front axle K of the vehicle G, and the said jaws I are pivotally connected at their outer faces with an upwardly-extending link L, connected by a spring L' with a lever N, fulcrumed in the body of the vehicle G and adapted to be locked to a segment N', carried in the said vehicle-body. Now by holding the lever N locked in a normal position the jaws I extend close to the opposite sides of the steering-rail H, so that the vehicle is guided by the said jaws following the steering-rail, and consequently the wheels F of the vehicle G travel properly on the rails A.

When it is desired to brake the vehicle, the operator then swings the lever N downward, so as to close the jaws I upon the sides of the steering-rail H, and when it is desired to run the vehicle off the track onto the road then the operator swings the hand-lever N upward, so as to completely open the jaws I—that is, to swing the same above the top of the steering-rail H—to allow of running the vehicle off the rails of the roadway.

The steering-rail H is anchored to the ground in a similar manner to that of the side rails—that is, the flanges H' are provided with depending pins D', carrying anchoring-blocks E', embedded in the ground.

The steering of the vehicle may be accomplished in a different manner, as indicated, for instance, in Figs. 4 and 5, in which the steering-rail $H^2$ is provided on the top with a longitudinally-extending groove $H^3$ and on its sides with grooves $H^4$, the groove $H^3$ being engaged by a small wheel or roller O, journaled in the free end of a spring O', secured to a beam P, extending upwardly and fulcrumed at P' on the axle K', carrying wheels F' of a vehicle G', the pivoted end of the beam P being pressed on on opposite sides by springs $P^2$, as plainly indicated in Fig. 5. The side grooves $H^4$ are engaged by small wheels or rollers Q, journaled in the free ends of springs Q', attached to the beam P, the same as the spring O', and the forward portion of the said beam P is spring-supported from the vehicle G'—that is, a spring R is connected at one end with the said beam and at its other end with a turnbuckle S, attached to the body of the vehicle G'.

Now by the arrangement described the wheels O and Q travel on the steering-rail $H^2$, and as the said wheels are journaled in the springs O' and Q', attached to the beam P, it is evident that the axle K', on which the beam is fulcrumed, causes a steering of the wheels F' to keep the same on the rails $H^2$ of the track. The springs O' and Q' readily accommodate the wheels O and Q to sharp curves or unevenness in the steering-rail.

Having thus described my invention, I claim as new and desire to secure by Letters Patent—

1. A roadway for vehicles, comprising parallel track-rails, the inner top portion of said rails being roughened, flanges formed on the outer top portion of said rails, cross-beams connecting said rails, means for anchoring the track-rails and the cross-beams in the ground, and a triangular steering-rail lying between the parallel track-rails, substantially as set forth.

2. The combination with a wheeled vehicle provided with a depending arm secured to one of the axles thereof, and having jaws pivotally secured to said arm, of flat track-rails for the vehicle-wheels to run on, a steering-rail between the track-rails flanged and adapted to be engaged by the pivoted jaws, and means for actuating said jaws, substantially as set forth.

3. A roadway for vehicles, comprising parallel track-rails made from metal plates, fish-plates for connecting the metal plates with each other, cross-beams on which opposite fish-plates are secured, and means comprising a block, having a pin extending therethrough for anchoring the track-rails and cross-beams in the ground, as set forth.

4. A roadway for vehicles, comprising parallel track-rails made from metal plates, fish-plates for connecting the metal plates with each other, cross-beams on which opposite fish-plates are secured, means for anchoring the track-rails and cross-beams in the ground, and a steering-rail, having the ends of its members secured to the cross-beams, the steering-rail being located approximately midway between the track-rails, as set forth.

5. The combination with a wheeled vehicle having a steering device under control of the operator, said steering device comprising a bracket or arm secured to the vehicle-axle, jaws pivotally connected to said arm, track-rails, comprising roughened metallic plates for the wheels to run on, a triangular steering-rail between the track-rails, flanked by and adapted to be engaged by said jaws, and means for actuating said jaws, substantially as set forth.

6. The combination with a wheeled vehicle having a steering device provided with movable jaws under the control of the operator, of track-rails consisting of metal plates for the vehicle-wheels to run on, and a steering-rail between the track-rails, flanked by and adapted to be engaged by the said jaws, and means connected with said jaws and under control of the operator and moving said jaws into engagement with the steering-rail, as set forth.

In testimony whereof I have signed my name to this specification in the presence of two subscribing witnesses.

JOHN B. HANSLER.

Witnesses:
 THEO. G. HOSTER,
 JNO. M. RITTER.